Nov. 1, 1938.  G. A. TINNERMAN  2,135,418

METHOD OF PROVIDING FASTENING MEANS IN SHEET METAL

Filed Oct. 4, 1937

INVENTOR.
GEORGE A. TINNERMAN
BY Bates, Goldrick, & Teare
ATTORNEYS

Patented Nov. 1, 1938

2,135,418

UNITED STATES PATENT OFFICE 2,135,418

METHOD OF PROVIDING FASTENING MEANS IN SHEET METAL

George A. Tinnerman, Rocky River, Ohio, assignor to Albert H. Tinnerman, Cleveland, Ohio Application October 4, 1937, Serial No. 167,309

7 Claims. (Cl. 29—148)

This invention relates to an improved method and arrangement for adapting sheet metal fasteners for the reception of screw threaded members. An important use of such fasteners is in connection with the securing of one or more threaded members to a supporting plate while the head of the threaded member acts to hold one or more pieces to the plate. Supports of this character have heretofore been assembled by the use of a threaded fastening device, such as threaded nuts, or strips of wood, which have been mounted behind the supporting plate and which have been adapted to be pierced by the threaded member.

An objection to the use of a threaded nut in the plate assembly is that it necessitates a rigid connection between the nut and plate such as by a riveting or welding operation, while an objection to the use of wood is the expense and difficulty of properly securing the wood in place. Moreover, wood lacks the permanency of metal.

Heretofore, an effort has been made to produce fasteners by forming them out of the metal of the plate. Where the metal has been relatively soft, however, the resulting fastener has lacked the desired mechanical strength because the deformed portion could not be hardened independently of the plate. Consequently, the lack of strength in the metal would allow the fastening portion to be pulled through the plate whenever excessive pressure is placed upon the threaded member.

An object of the present invention is to make a threadless fastener which is so formed that it cannot readily be pulled through the plate, notwithstanding the fact that the fastener is made of relatively soft material such as annealed metal. In this connection, my invention contemplates a construction wherein the thread engaging portion can be readily formed in the shape of a helix without distorting it in any manner that would prevent a threaded bolt from entering it and turning in it, in the proper manner.

I carry out my invention by piercing a blank or a plate from which the fastener is intended to be formed, to make the bolt-receiving aperture, and in doing so I made an opening which is smaller in size than the diameter of the thread on the bolt. Additionally, I make such opening irregular in shape, so that when metal is subsequently drawn from the blank to form the thread-engaging portion, the resulting bolt receiving opening will be enlarged sufficiently to admit the bolt, and at the same time the marginal edges of the opening will be regular in form.

Figure 1:
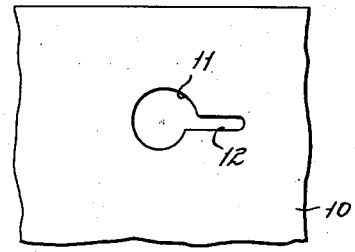
Figure 2:
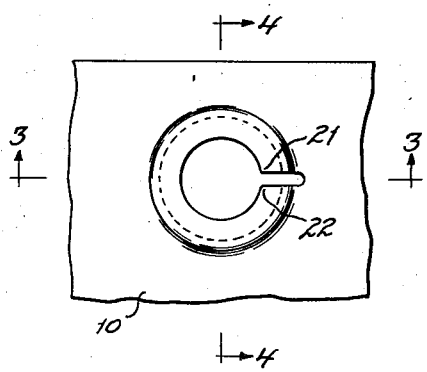
Figure 3:
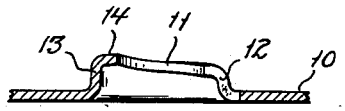
Figure 4:
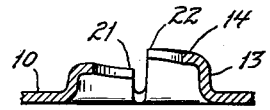

Referring now to the drawing, Fig. 1 is a top plan view of a plate or blank in which the first step in the formation of the fastener has been performed; Fig. 2 is a smaller view showing a modification of the fastener; Figs. 3 and 4 are sections taken on the correspondingly numbered lines in Fig. 2, and Fig. 5 is a section taken through two parts to be joined and illustrating the use of the fastener in connection with a threaded member.

In the drawing, the fastener is shown as being formed from a blank or plate 10 which may possess any desired dimension. The first step in forming the fastener is to pierce an irregular aperture 11 and a slot 12 therein; the slot extending in a general radial direction from the opening 11. The next step is to form the thread engaging portion and this is preferably accomplished by drawing the metal upwardly from the body to form a substantially cylindrical wall 13 which has an inturned flange 14 adjacent the marginal edges of the opening 11.

Figure 5:
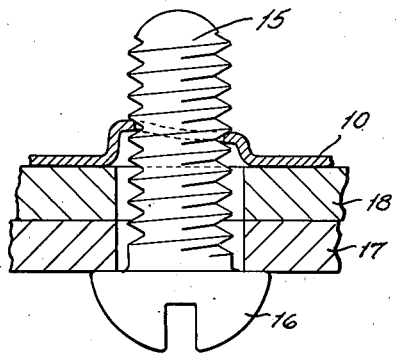

During the forming operation, said inturned flange of the fastener is arranged in the shape of a helix and the metal is stretched so as to increase the size of the opening 11, and to make it large enough for receiving a threaded member such as that indicated at 15 in Fig. 5. During the forming operation, the irregular shape of the opening 11 is changed to a regular geometrical shape of substantially circular formation as is shown in a plan view in Fig. 2 and during such formation the points 21 and 22 are separated a distance corresponding to the pitch distance of the thread on the bolt with which the fastener is intended to be used. In Fig. 5, the fastener is illustrated in connection with a threaded bolt, the head 16 of which bears against an article 17 which is apertured to receive the bolt shank, while another article 18 is interposed between the article 17 and the plate 10.

By making the bolt receiving aperture irregular in form, in advance of the final deformation of the thread engaging portion and by enlarging the opening to make it receive a bolt, the marginal portions of the aperture can be shaped to conform to the helix of a bolt thread without distorting the metal in any manner that would hinder the turning of the bolt within the fastener. Additionally by making the fastener, as indicated, I obtain one which may be constructed of cold rolled metal and which will possess sufficient strength to resist any tendency to pull through without being hardened at the completion of the forming operation.

I claim:

1. The method of providing a sheet metal plate with screw thread engaging means in the form of a protuberance projecting out of the plane of said plate, comprising, punching an opening substantially smaller than the diameter of the screw in the sheet of metal, and then drawing a portion of the metal adjacent said opening out of its normal plane to provide a wall which is of substantially cylindrical form and shaping said opening to permit the passage of the screw intended to be threaded thereinto.

2. The method of providing a sheet metal plate with bolt thread engaging means in the form of a protuberance projecting out of the plane of said plate, comprising, making a bolt receiving opening therein smaller than the body of the bolt, upsetting the metal surrounding the opening to form a protuberance projecting out of the plane of the plate and to enlarge said opening sufficiently to receive the body of the bolt, and bending the marginal edges of the opening in the protuberance into a flange having the shape of a helix that conforms substantially to the helix of the thread on the bolt with which the bolt engaging means is intended to be used.

3. The method of providing a sheet metal plate with bolt thread engaging means in the form of a protuberance projecting out of the plane thereof, comprising, piercing the plate to make an irregularly shaped opening, smaller than the diameter of the bolt with which the bolt engaging means is intended to be used, drawing the metal out of the plane of the plate in the form of a cylinder and forming an inturned thread engaging flange on the top of the cylinder, while at the same time enlarging the opening so as to admit the bolt, and shaping the cylinder so that the flange lies in the form of a helix which conforms to that of the bolt with which the bolt engaging means is intended to be used.

4. The method of adapting sheet metal for the reception of a screw which comprises providing in the sheet an opening materially smaller than the screw, bending the sheet immediately adjacent the opening to provide a cylindrical wall extending out of the plane of the sheet with the opening enlarged to receive the root diameter of the screw and distorting a portion of said wall such that the edge thereof at the opening lies on a helix corresponding to that of the threads of the screw.

5. The method of adapting sheet metal for the reception of a screw which comprises providing in the sheet an opening materially smaller than the screw, drawing an area of the sheet adjoining the opening to provide a substantial wall extending out of the plane of the sheet and to enlarge the opening in the wall sufficient to receive the root diameter of the screw, and shaping that portion of said wall adjacent said opening to provide an effective thread engaging portion which is substantially flat and engages the screw on a plane substantially at right angles to the axis thereof.

6. The method of adapting sheet metal for the reception of a screw which comprises providing in the sheet an opening materially smaller than the screw, drawing an area of the sheet adjoining the opening to provide a substantial wall extending out of the plane of the sheet and to enlarge the opening in the wall sufficient to receive the root diameter of the screw, and shaping said wall adjacent said opening such that the effective thread engaging portion thereof is substantially flat and lies on a helix corresponding to that of the threads of the screw to have uniform threaded engagement therewith on a plane substantially at right angles to the axis of the screw.

7. The method of adapting sheet metal for the reception of a threaded fastener which comprises, providing in the sheet an opening to receive the threaded fastener, drawing an area of the sheet surrounding the opening to provide a substantial projecting wall extending out of the plane of the sheet with the opening formed to a size sufficient to receive the root diameter of the threaded fastener, and shaping a portion of said projecting wall immediately adjacent the opening to provide an inturned flange thread engaging portion supported by said projecting wall extending out of the plane of the sheet and engaging the threads of the threaded fastener on a plane substantially at right angles to the axis thereof.

GEORGE A. TINNERMAN.